United States Patent [19]

Emon et al.

[11] 4,241,725
[45] Dec. 30, 1980

[54] SOLAR ENERGY COLLECTOR

[76] Inventors: Donald E. Emon; Barbara D. Emon, both of 23029 Timber Creek La., Clarksburg, Md. 20734

[21] Appl. No.: 42,705
[22] Filed: May 25, 1979
[51] Int. Cl.³ .............................................. F24J 3/02
[52] U.S. Cl. .................................. 126/428; 126/435; 126/450
[58] Field of Search ............... 126/450, 449, 428, 429, 126/434, 435; 165/106; 98/40 D

[56] References Cited

U.S. PATENT DOCUMENTS

| 4,029,080 | 6/1977 | Warren | 126/450 |
| 4,088,118 | 5/1978 | Benseman | 165/106 |
| 4,103,825 | 8/1978 | Zorning | 126/429 |
| 4,125,222 | 11/1978 | Briscoe | 126/429 |

Primary Examiner—James C. Yeung
Attorney, Agent, or Firm—Joseph J. Baker; Gerald J. Ferguson, Jr.

[57] ABSTRACT

A solar water heating device is disclosed adapted to be installed in the area beneath the roof of a building structure, the device has an inner tube surrounded by and substantially coextensive with an outer tube through which solar heated air flows by natural convection. Water is passed through the inner tube where it is heated by the flowing air for direct use or to supplement the water heated in a conventional water heater, and any condensation formed in the device is collected and drained away.

13 Claims, 5 Drawing Figures

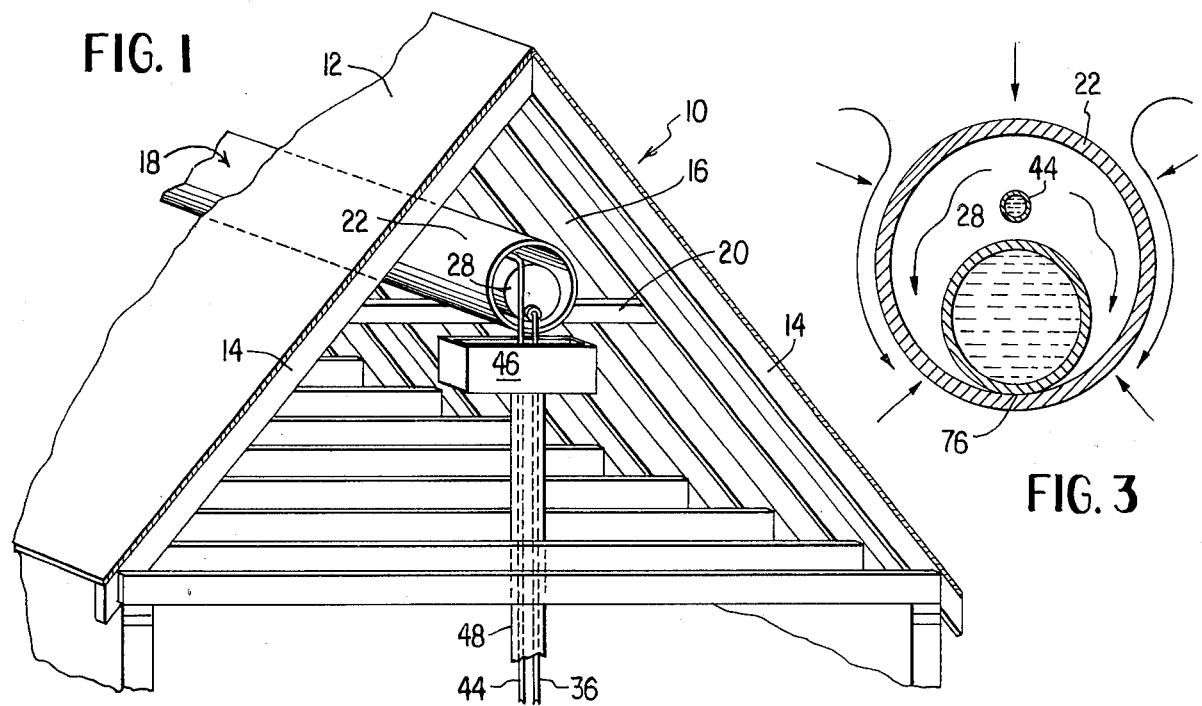
FIG. 1
FIG. 3
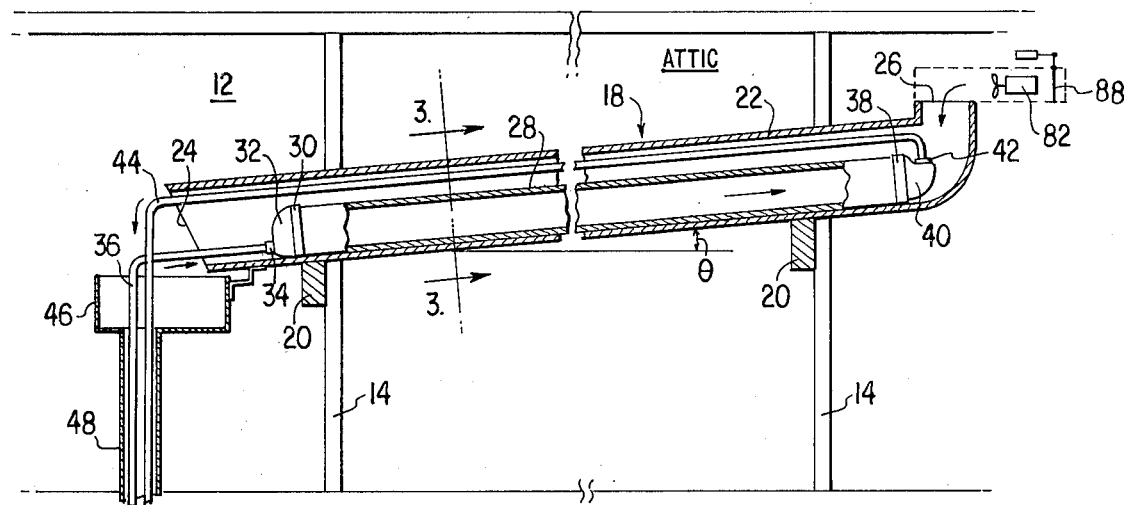
FIG. 2
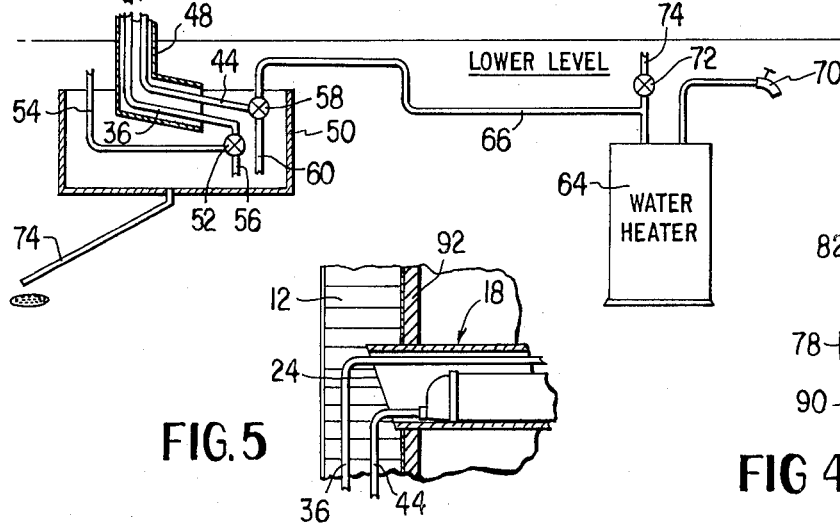
FIG. 5
FIG 4

SOLAR ENERGY COLLECTOR

BACKGROUND OF THE INVENTION

This invention relates to solar water heating devices and more specifically to a device installable in the area beneath the roof of a building structure and through which solar heat collected there can be circulated for heating water in the device. Applicants are unaware of any device in the prior art adapted to be installed in the attic or open area beneath the roof of a building structure for absorbing the great quantities of solar heat trapped therein. All of the prior patent art devices of which applicants are aware position the solar heat collecting devices on the outer surface of the roof or on the ground where they are exposed to the weather and subject to the deterioration caused thereby. Water is often the medium for transferring the heat from the absorber element of the collector to a reservoir or other point of use within or outside the structure to which the collecting device is attached, a typical example of which is shown in U.S. Pat. No. 3,859,980. Other types of prior art exteriorly mounted devices utilize air which absorbs heat from the sun and transfers its thermal energy by convection to an absorber usually containing water, a typical example of which is shown in U.S. Pat. No. 3,960,136.

As a result of the fact that applicants' solar water heating device is entirely located beneath and protected by the roof and walls of the building structure, no expensive corrosion and weather resistant materials need be used in its construction, no heat is convected away from the device by wind or conducted away by rain water, no fear or damage to the device is present caused by airborne debris, falling tree limbs and the like, no critical positioning of the device in the path of the sun's rays is required, and no unsightly equipment is visible on the exterior of the house.

Accordingly, it is an important object of the present invention to provide a solar water heating device which is capable of efficiently transferring by air, conduction and radiation large quantities of solar heat trapped in the area beneath the roof of a structure to an absorber within the device through which water to be heated is passed.

It is another important object of the present invention to provide a solar water heating device which is not direction critical but rather utilizes solar heat collected beneath the entire roof of a building structure.

It is another important object of the present invention to provide an efficient solar water heating device which is extremely simple and inexpensive in its construction, installation and maintenance due to its unique location in a protected environment.

It is another important object of the present invention to provide a solar water heating device that can be naturally drained prior to the onset of freezing weather, refilled easily, and is designed to avoid water damage to the structure in which it is installed should leaks or ruptured piping occur.

These and other objects and advantages of the invention will become apparent upon reference to the following specification, attendant claims and drawing.

SUMMARY OF THE INVENTION

Briefly, these and other objects of the invention are obtained by a solar energy collector which is adapted to be positioned beneath the roof of a building structure and preferably near the apex of the roof if such is of the peak or slanted type. The collector comprises a first cylindrical shaped tube mounted such that one open end is at a lower elevation than the other to permit any condensation collected or water from leaks or breaks within the tube to be drained therefrom. A second cylindrical shaped tube is located within the first tube and extends substantially the length of the first tube. The ends of the second tube are capped, one serving as an inlet for cold water from a source, the other as an outlet for the heated water. A collection tank with a drain is positioned at the lower opening of the first tube for disposing of the aforementioned condensation. Air flows into the elevated end of the first tube and around the second tube by natural convection whereupon its heat is given up to the second tube and the water passing therethrough. Heat is also transferred to the second tube by conduction and radiation. The resultant cooler, more dense air flows toward the lower elevated end and out. Natural convection is normally sufficient, however, if more rapid flow is desired, a small fan can be positioned in the upper opening of the first tube.

BRIEF DESCRIPTION OF THE DRAWINGS

FIG. 1 is a perspective view, partially cut away, of a structure which utilizes the solar energy collector of the present invention.

FIG. 2 is a view, in partial vertical section, of a solar energy collector constructed in accordance with the present invention and mounted at an angle beneath the roof of a building structure.

FIG. 3 is a cross-sectional view of the solar energy collector of the present invention taken along the lines 3—3 of FIG. 2.

FIG. 4 is a cross-sectional view of another embodiment of the solar heat collector of the present invention.

FIG. 5 is a partial view of the end of the solar heat collector exiting the end of the building structure.

DETAILED DESCRIPTION OF THE INVENTION

Referring now to the drawings where like characters of reference refer to similar elements in each of the several figures, numeral 10 in FIG. 1 is a building structure, in this instance a private residence, which has its water heated totally or in part by the solar energy collection system of the present invention. The roof 12 of the structure is formed in a peaked fashion by means of a plurality of rafters 14 to which roofing boards and shingles are attached. During the operating period of the collection system of the present invention which may be year round in southern regions of the country or only in summer in more northern regions of the country, solar energy is absorbed by the roof 12 thereby warming the air in the space 16 beneath the roof particularly adjacent the area where the rafters 14 are peaked.

The solar energy collector 18 of the present invention preferably is located in the space 16 and is supported between two or more braces 20 secured to rafters 14. For clarity, only one solar energy collector 18 is shown, it being understood, of course, that a plurality of such collectors could be similarly mounted if greater water heating capacity were desired. The entire collector 18 is mounted at a slight angle θ of, for example, ten degrees with respect to the horizontal for reasons that will be discussed in detail later. The collector 18 comprises an outer or first hollow, cylindrical-shaped tube 22 preferably made of relatively thin gauge sheet metal. The collector 18 has an open end 24 positioned at a lower elevation than the open end 26 as a result of the positioning of the entire collector 18 at the aforementioned angle θ. An inner or second hollow, cylindrical-shaped tube 28 is located within and substantially coextensive with the outer tube 22. The inner tube 28 is a conventional pipe having a wall thickness sufficient to contain water at conventional residential pressures. A portion of the bottom surface of inner tube 28 is in heat conductive engagement with the inside surface of outer tube 22. The lower end 30 of the inner tube 28 has a cap 32 and an inlet 34 to which is connected a water inlet pipe 36. Inlet 34 is located at the lowest practical elevation and outlet 40 is at the highest practical elevation to assure complete natural drainage and filling of the system. The inlet pipe 36 extends out the open end 24. The upper end 38 of the inner tube 28 also has a cap 40 and an outlet 42 to which is connected a water outlet pipe 44 which extends along the inner tube 28. The water inlet and outlet pipes 34,42, respectively, extend downwardly toward an open ended collection tank 46 positioned below the edge of the lower end 24 of the outer tube 22. The bottom of the collection tank 46 has an opening connected to a drain pipe 48 which extends from the collection tank, through the interior of the building structure 10 to a basin 50. The basin 50 itself is connected to the sewer system of the structure. The drain pipe 48 is of sufficient diameter to permit both inlet and outlet pipes 34,42 respectively to be contained therein throughout the length of the drain pipe 48 to a point where they exit the drain pipe in the vicinity of the basin 50.

The collection tank 46 serves to both collect and drain away any condensation which may form on the outside of inner tube 28 or the inside of outer tube 22. The slope θ of the collector device 18 facilitates this drainage and prevents any standing water in the device which may rust the structural elements of the device. The drain pipe 48, inlet and outlet pipes 36,44 are to be installed in such a manner that natural or gravity induced complete drainage is achieved of the water toward basin 50. In addition, in the event the system is not drained when required and any of the piping, joints or inner tube 22 burst from freezing, the large quantity of water discharged through such a rupture can be safely and efficiently drained to the basin 50 through the large drain pipe 48 thereby avoiding any damage to the building structure 10.

To complete the system, the inlet pipe 36 is connected to a three-way valve 52 which, in turn, is connected to the cold water supply pipe 54 and to a drain pipe 56 opening into basin 50. In one position of the valve 52, the drain pipe 56 is shut off and cold water from supply pipe 54 is permitted to enter water inlet pipe 36. In the other of its positions, valve 52 prevents water from supply pipe 54 from entering water inlet pipe 36 and permits water in water inlet pipe 36 to drain into basin 50 during shutdown of the system. Similarly, a three-way valve 58 is connected to outlet pipe 44 and also to a drain pipe 60 and the inlet pipe 62 of a conventional hot water heater 64. In a first position of valve 58, the drain pipe 60 is shut off and the heated water from the collector 18 is permitted to enter the hot water heater 64 in a pipe 66 and inlet 62 as hot water is removed at a point of use, here shown as faucet 70. As can be seen, the line fluid pressure in cold water supply pipe 54 is utilized to move cold water to and heated water from the collector 18, through the water heater 64 to the point of intended use, thus no separate electric pumping apparatus is required. A valve 72 is also provided, connected between a cold water supply pipe 74 and the inlet 62 above the connection point of pipe 66 to inlet 62. Closure of valve 72 insures than only preheated water from the collector 18 is permitted to enter the hot water heater 64 whereas when valve 72 is open, a mixture of preheated and cold water is permitted to enter the water heater 64. When valve 58 is in its other position, water to pipe 66 is cut off and the water in the inner tube 28 and outlet piping 44 is permitted to drain into basin 50 and to the sewer via outlet 74.

As can be seen with further reference to FIG. 3, the solar collector 18 utilizes primarily the natural convection of the air through outer tube 22 to obtain useful heat energy. The roof 12 absorbs heat from the sun over the entire area exposed thereto and heats the air beneath the roof. The warm air thus heated will tend to rise to the peaked area of the roof 12 adjacent the collector 18 there attaining elevated temperatures. The less dense heated air will flow in inlet 26 of outer tube 22 and around inner tube 28 thereby heating it and the water contained therein. The extraction of heat by the inner tube 28 reduces the temperature of the air passing thereby. This relatively cooler and thus more dense air flows toward the bottom of the collector 18 and out the lower open end 24. Thus, there is a continuous flow of the air through the collector 18 as a result of the natural convection caused by this heating and cooling of the air. During operation of the collector 18, the outer tube 22 is also heated in part due to radiated heat directed against its outer surface as well as that extracted during the convection of the heated air passing adjacent its inner surface. By positioning the inner tube 28 such that a portion of the bottom of substantially its entire length is in contact with the inner surface of the outer tube 22 as shown at 76, the heat from the outer tube 22 will flow by conduction to the inner tube 28 to also heat the water therein. Further, by bringing the water to be heated in at inlet 34 and the hot water out at outlet 42, the respective ends of the inner tube 28 will be at temperatures which materially aid in the flow of convection air currents running from right to left as the device is viewed in FIG. 2.

FIG. 4 illustrates another embodiment of the collector 18 of the present invention utilizing two inner tubes 78 and associated hot water outlet pipes 80. The outer surface of the inner tubes 78 as well as the outer surface of the outer tube 82 may be equipped with fins 84 to increase the surface area in contact with the radiated and convected heat in the air. A small fan 86 (shown within the phantom lines in FIG. 2) may be required if it is found that the fins 84 retard the natural convection of heated air around the inner tubes 78. The presence of more than one inner tube and associated piping will increase the overall cost of the collector 18, however, the increased surface area both in contact with the convected heat and the conducted heat through areas 90 will result in greater efficiency, thus offsetting much of the added cost. A damper 88 (shown within phantom line in FIG. 2) may also be desired at the inlet 34 to precisely control the passage of air through the collection device 18.

FIG. 5 illustrates a variation in the location of the collection device 18. The lower end 24 is positioned in a recess through the endwall 92 of the building structure such that the end 24 is open to the outside atmosphere. This variaton eliminates the need for the collection tank 46 and associated drain pipe 48. Any condensation forming within the device would merely drain to the ground below. In addition, should any malfunction of the device occur in the form of ruptured water carrying piping, the leaking water would immediately and completely flow outside the structure where it would be easily visible and thus do no damage to the interior of the structure.

By way of example and not limitation, applicants have found that in a typical installation where a single four inch diameter inner tube was used with a seven inch diameter outer tube and each tube being approximately 42 feet long, the heat needed to raise the approximately 28 gallons of water contained therein from 50° F. to 140° F. was approximately 21,000 BTU (British Thermal Units) and the time required was approximately one and one-half hours. In contrast, the time required to accomplish the same result without the benefit of applicants' unique construction was found to be approximately five and one-half hours. The water heated by the device of the present invention could be used for numerous other purposes in addition to supplementing a conventional water heater as herein described, such as heating a swimming pool, or the structure itself or the heat could be stored to be used at a later time.

While particular preferred embodiments of the various aspects of the present invention have been illustrated in the accompanying drawings and described in detail herein, other embodiments are within the scope of the invention and the following claims.

What is claimed is:

1. In a building construction having an enclosed occupant space, a roof structure, and a solar heated air space between said occupant space and said roof structure, a solar water heating device adapted to be installed in said air space, said device comprising:
   (a) a first hollow tube mounted in proximity to said roof structure and within said air space, said first tube having first and second open ends, said first open end being at a lower elevation than said second open end to facilitate the drainage of water, and the passage of solar heated air by natural convection therethrough, and
   (b) at least one second hollow tube within and substantially coextensive with said first tube, said second tube having an inlet means at one end thereof for introducing water to be heated to said second tube and an outlet means at said other end for removing water from said second tube heated by said convected air.

2. A solar water heating device as set forth in claim 1 further comprising means adjacent said first open end to receive said draining condensation.

3. A solar heating device as set forth in claim 1 wherein said solar heated air gradually gives up its heat by convection and radiation to said second tube as it passes from its entrance at said second open end to its exit at said first open end, and said inlet means at said one end is adjacent said exiting, cooler air.

4. A solar heating device as set forth in claim 3 wherein said outlet means at said other end is adjacent said entering, warmer air.

5. A solar heating device as set forth in claim 3 wherein said inlet means further comprises coupling means on said one end of said second tube connected to a cold water inlet pipe, said inlet pipe extending through said first open end and wherein said outlet means further comprises coupling means on said other end connected to a heated water outlet pipe, said outlet pipe extending the length of said second tube through said first open end.

6. A solar heating device as set forth in claim 5 wherein said means for receiving said draining condensation is an open ended tank having a drain pipe in the bottom thereof and wherein said inlet and outlet pipes of said second tube pass through and are coextensive with said drain pipe to thereby safely carry away any water leaking from said inlet and outlet pipes or said second tube.

7. A solar heating device as set forth in claim 6 wherein said first and second tubes, said coupling means, said inlet pipe and said outlet pipe and said drain pipe are positioned so as to ensure complete gravity induced drainage of water from all areas of the device.

8. A solar heating device as set forth in claim 1 wherein said passage of said solar heated air is assisted by fan means adjacent said other end of said first tube.

9. A solar heating device as set forth in claim 1 further comprising heat absorbing fins secured to said first and second tubes on the outer surfaces thereof.

10. A solar heating device as set forth in claim 1 wherein said second tube has a substantial portion thereof in engagement with said first tube for the conduction of heat from said first tube to said second tube.

11. In a building construction having an enclosed occupant space, a roof structure, and a solar heated air space between said occupant space and said roof structure, a solar water heating device adapted to be installed in said air space, said device comprising:
   (a) a first hollow tube mounted in proximity to said roof structure and within said air space, said first tube having first and second open ends, said first open end being at a lower elevation than said second open end and extending through a recess in an outer wall of said building construction to facilitate the drainage of water directly from said first open end,
   (b) at least one second hollow tube within and substantially coextensive with said first tube, said second tube having an inlet means at one end thereof for introducing water to be heated to said second tube and an outlet means at said other end for removing water heated by said solar heated air from said second tube, and
   (c) fan means connected to said second open end for assisting the passage of said solar heated air through said first hollow tube.

12. In a building construction having an enclosed occupant space, a roof structure, and a solar heated air space between said occupant space and said roof structure, a system for supplying heated water from a source to points of intended use comprising in combination:
   (a) a conventional water heater having an inlet and an outlet connected to said points of intended use,
   (b) a solar water heating device adapted to be installed in said air space beneath said roof structure and having a first hollow tube mounted in proximity to said roof structure and within said air space, said first tube having first and second open ends, said first open end being at a lower elevation than said second open end to facilitate the drainage of water and the passage of said solar heated air by natural convection therethrough, and, (c) at least one second hollow tube within and substantially coextensive with said first tube, said second tube having an inlet means at one end thereof connected to said source and an outlet means at said other end connected to said inlet of said conventional water heater for receiving water from said second tube heated by said convected air.

13. In a building construction having an enclosed occupant space, a roof structure, and solar heated air space between said occupant space and said roof structure, a solar water heating device adapted to be installed in said air space, said device comprising:

(a) a first hollow tube mounted in proximity to said roof structure and within said air space, said first tube having first and second open ends, said first open end being at a lower elevation than said second open end to facilitate the drainage of water therefrom and said second open end having fan means connected thereto for assisting the passage of solar heated air through said first hollow tube, and (b) at least one second hollow, cylindrical-shaped tube within and substantially coextensive with said first tube, said second tube having an inlet means at one end thereof for introducing water to be heated to said second tube and an outlet means at said other end for removing water from said second tube heated by said solar heated air.

* * * * *